United States Patent [19]

Perche

[11] Patent Number: 4,672,756
[45] Date of Patent: Jun. 16, 1987

[54] MACHINE FOR GATHERING OYSTERS

[76] Inventor: Herve Perche, Monsegu, 64470 Tardets, France

[21] Appl. No.: 785,745

[22] Filed: Oct. 9, 1985

[51] Int. Cl.$^4$ .......................... H01K 80/00; E02F 5/00
[52] U.S. Cl. .......................................... 37/55; 171/25; 171/115
[58] Field of Search ................. 37/55, 64; 171/58, 62, 171/25, 115; 56/327

[56] References Cited

U.S. PATENT DOCUMENTS

| 653,136 | 7/1900 | Dambacher | 171/25 |
| 2,418,924 | 4/1947 | Booth | 171/25 |
| 2,842,215 | 7/1958 | Morrison | 171/115 |
| 2,894,340 | 7/1959 | Thale | 37/55 |
| 3,057,104 | 10/1962 | Constantopes | 37/55 |

FOREIGN PATENT DOCUMENTS

| 1564741 | 4/1969 | France | 37/55 |
| 1585254 | 1/1970 | France | 37/55 |
| 570628 | 7/1945 | United Kingdom | 171/25 |
| 1405674 | 9/1975 | United Kingdom | 37/55 |

Primary Examiner—Clifford D. Crowder
Attorney, Agent, or Firm—Young & Thompson

[57] ABSTRACT

A machine for gathering oysters from an oyster bed, comprises a chassis (1) on which are carried a motor (2) and a gearbox (3). Two uprights (4) support endless treads (5) and the forward portion of the chassis supports an inclined frame (6) on which are mounted gathering members constituted by two adjacent circular flexible discs (7) each secured centrally to a rotatable axle (8). The discs are disposed above a fixed inclined comb (11) adapted to raise oysters sunk in the soil and/or distributed over this latter during movement of the machine so that the oysters will be seized during rotation of the discs (7) by flexible projections (10) arranged in star shape and projected rearwardly, the rotation of the axles (8) and the forward movement of the machine being obtained by drive belts connected to the gearbox.

5 Claims, 3 Drawing Figures

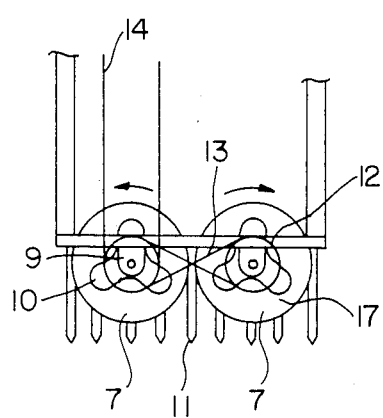
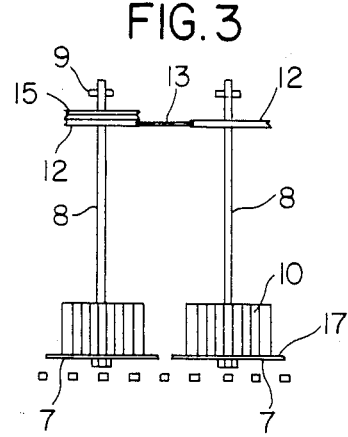

MACHINE FOR GATHERING OYSTERS

The present invention relates to a machine permitting the gathering of oysters from the surface of an oyster bed.

It is known to gather oysters manually from the surface of oyster beds, by forks as well as by different machines such as those described in French Pat. Nos. 1,564,741 and 1,585,254, comprising a chassis on which is disposed the gathering apparatus constituted by fingers and/or buckets disposed parallel to each other and spaced apart along cross members connecting at least two parallel chains and/or on an endless belt that circulates about two sprockets or drums of which one is power driven so as to move said chains and/or belt and to ensure the gathering of the oysters by movement of the fingers and/or buckets scraping the marine soil. These machines have the disadvantage of high price and large size and low maneuverability.

The machine according to the invention has for its object to overcome the above disadvantages.

The invention has for its object the provision of a machine for gathering oysters, comprising a chassis supported by movable members such as endless treads. On the chassis is secured the drive motor connected to the movable members and gathering members disposed at the front of the chassis, constituted by two adjacent rotatable discs of flexible material having star-shaped projections on their upper portion such that during displacement of the chassis, the oysters raised from the soil by a fixed comb disposed below these discs, are seized by the converging portions of the oppositely rotating discs, by the star-shaped projections and impelled rearwardly where they are caught in a receptacle.

Other characteristics and advantages of the invention will become more apparent from the description which follows, given in respect to the accompanying drawings which comprise a non-limiting example, in which:

FIG. 2 is a view from above of the gathering elements; and

FIG. 3 is a front view of the gathering elements.

Figure 1:
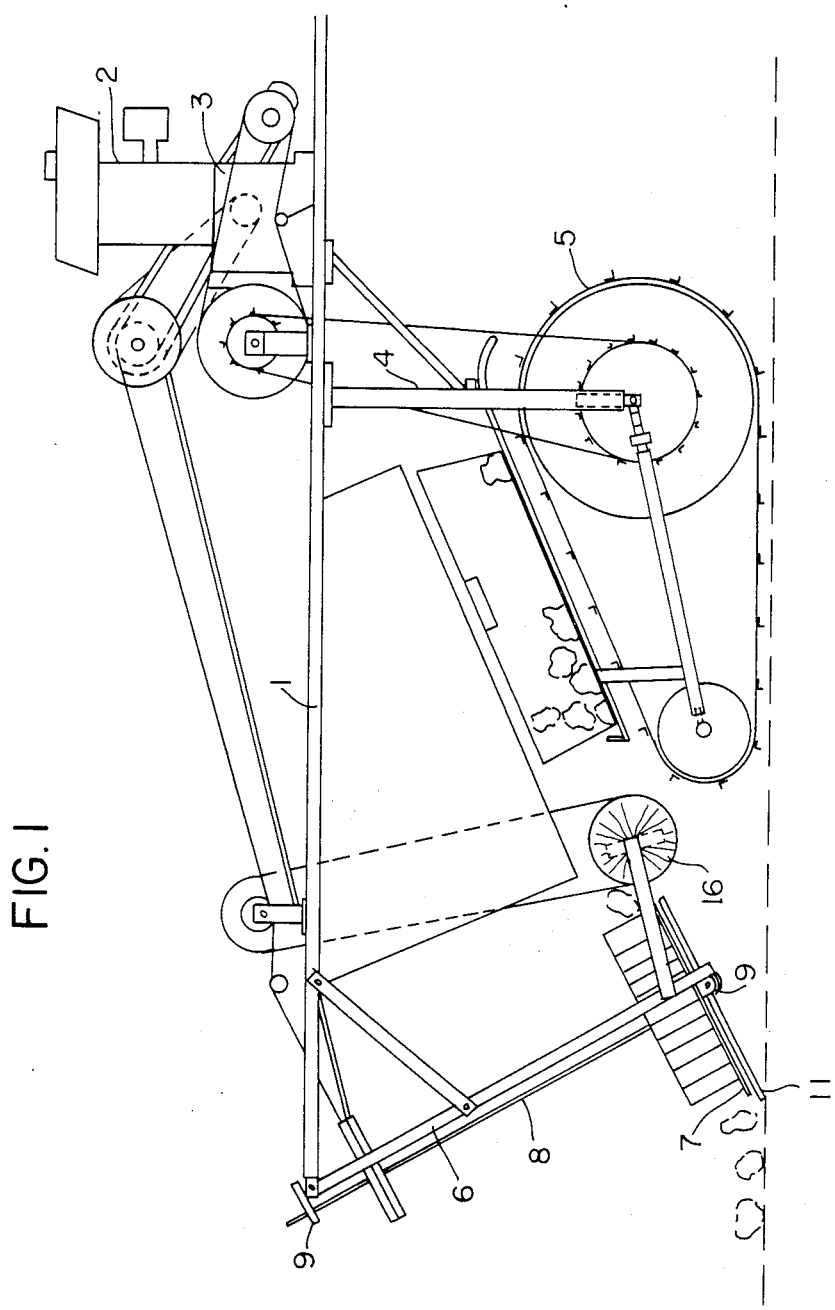
FIG. 1 is a side view of a machine according to the present invention.

As shown in FIGS. 1 to 3, the machine comprises a chassis 1 on which are mounted a motor 2 and a gearbox 3. Two uprights 4 support endless treads 5 and at the front an inclined frame 6 on which are mounted the gathering means constituted by two adjacent circular flexible discs 7 each centrally secured to a rotatable axle 8. Each axle 8 is mounted in bearings 9 on the inclined frame 6. The upper surface 17 of the flexible discs 7 carries upwardly extending flexible star-shaped protrusions 10. The upper portion each of the rotatable axles 8 is secured to a pulley 12 receiving a drive belt 13, which latter is crossed at its center so as to drive the discs 7 in opposite directions so that their forward portions converge, as shown in FIG. 2 by the arrows. The rotation of the discs 7 is effected by any suitable means connected to the gearbox 3, such as for example a drive belt 14 engaging pulley 15 secured to one of the axles 8.

The flexible discs 7 are disposed above an inclined comb 11 adapted to raise the oysters buried in the marine soil and/or distributed over this latter, during movement of the machine, whereby oysters raised by the comb 11 are seized by the flexible star-shaped protrusions 10 and projected rearwardly into a collection receptacle.

So as to remove part of the soil from the shells of the oysters, during their projection, the oysters are contacted by a rotatable brush 16 driven for example by a pulley and drive belt.

It follows that the machine, and particularly the gathering members, are not limited in use to the gathering of oysters, but can be used with advantage for gathering shell fish for example and/or in general for any solid bodies resting on the ground.

What is claimed is:

1. In a machine for gathering oysters, comprising a chassis (1), means (5) supporting the chassis for movement over an oyster bed, the chassis carrying drive means (2 and 3) connected to the support means (5), and gathering means (7) at the forward portion of the chassis; the improvement in which the gathering means is comprised by two flexible circular discs (7) adjacent to each other and each secured centrally on an upwardly extending rotatable axle (8) on an inclined frame (6) of the chassis, the discs having on their upper surface flexible projections (10) that extend radially outwardly from each said axle (8), collection means to the rear of the discs, and a fixed inclined comb (11) below the flexible discs, whereby during movement of the chassis, the oysters raised by the comb are seized by the flexible projections above the discs and are projected rearwardly into said collection means.

2. Machine according to claim 1, in which the flexible projections on the upper side of the discs are star shaped.

3. Machine according to claim 1, in which the discs rotate in opposite directions with their forward portions converging.

4. A machine as claimed in claim 1, and a brush rotatable about a horizontal axis disposed behind the discs and in front of the collection means and in the path of oysters projected by the flexible projections, for cleaning the shells of the oysters, and power means for rotating the brush about said horizontal axis.

5. A machine as claimed in claim 1, said discs being flat and coplanar and parallel to the comb.

* * * * *